United States Patent Office 3,496,196
Patented Feb. 17, 1970

3,496,196
4,6-DIAZIDO-4,6-DIDEOXY-MYO-
INOSITOL TETRAACYLATES
Tetsuo Suami and Seiichiro Ogawa, Tokyo, Japan, assignors to Tanabe Pharmaceutical Co., Ltd., Doshomachi, Higashi-ku, Osaka-shi, Osaka, Prefecture, Japan
No Drawing. Filed Sept. 29, 1966, Ser. No. 583,096
Claims priority, application Japan, Oct. 2, 1965,
40/60,467, 40/60,468
Int. Cl. C07c *117/00, 91/00*
U.S. Cl. 260—349                              2 Claims

ABSTRACT OF THE DISCLOSURE

Intermediates useful for the preparation of aminocyclitols, streptamine and streptomycin having the structural formula:

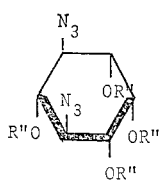

wherein R'' is a lower carboxylic acyl group, preferably, acetyl.

The present invention relates to aminocyclitols, and production thereof. More particularly, it relates to aminocyclitols useful as intermediates in the synthesis of streptamine, and production thereof.

As well known, streptamine is a constituent of streptomycin and an important starting material in the synthesis of the antibiotic. There have heretofore been known two routes for the synthesis of streptamine, the one being from natural glucosamine [M. L. Wolfrom et al.: J. Am. Chem. Soc., 72, 1724 (1950)] and the other being from myo-inositol [K. Heyns et al.: Chem. Ber., 89, 1152 (1956)]. These known synthetic routes, however, require a number of intricate steps. The present inventors have now completed a novel and facile synthetic route for streptamine from 1,2:3,4-di-O-isopropylidene-epi-inositol through several steps.

Accordingly, a basic object of the present invention is to embody a novel route for the synthesis of streptamine. Another object of this invention is to embody a process for preparing streptamine with facility. A further object of the invention is to embody some novel aminocyclitols useful as intermediates in the synthesis of streptamine. These and other objects will be apparent to those conversant with the art to which the present invention pertains from the subsequent description.

The substantial conversion in the present invention is illustratively shown by the following scheme:

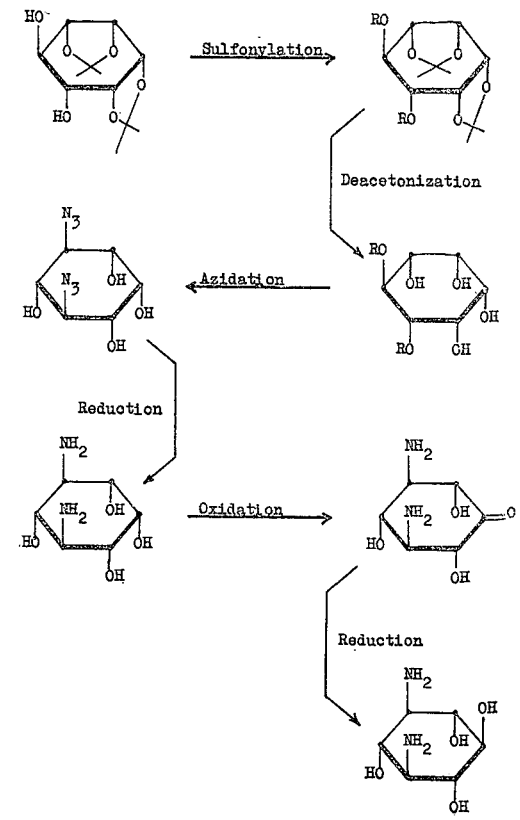

wherein R is a lower sulfonic acyl group such as alkanesulfonyl (e.g. methanesulfonyl, ethanesulfonyl) or arenesulfonyl (e.g. benzenesulfonyl, p-toluenesulfonyl, p-bromobenzenesulfonyl).

As to the above scheme, it should be understood that the conversion shown is substantial and practically accomplished with some modifications such as acylation. Thus, the OH and NH$_2$ groups of the compounds in the above scheme are intended to represent not only free amino and hydroxyl groups but also acylated amino and hydroxyl groups, inclusively.

Although various modifications are possible, the practical and preferred one is shown in the following scheme:

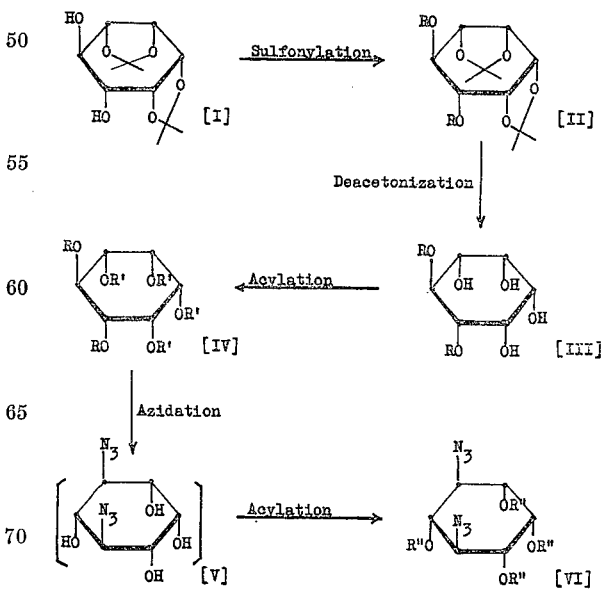

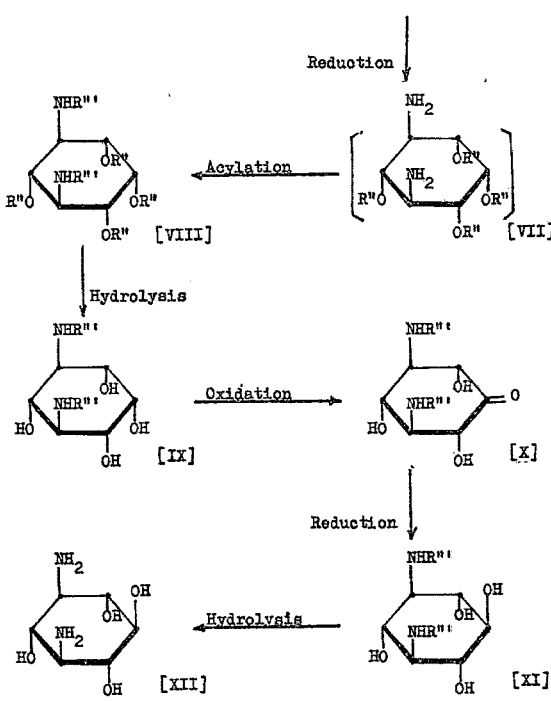

wherein R′, R″ and R‴ are each a lower carboxylic acyl group such as alkanoyl (e.g. acetyl, propionyl) or aroyl (e.g. benzoyl, toluoyl) and R has the same significance as designated above. In this scheme, the compounds in the parenthesis are usually obtained in the mixture with partially acylated or hydrolyzed compounds corresponding thereto. Although the composition of such mixture depends on the reaction conditions actually adopted, the formulae as shown are tentatively used for convenience on illustration.

The present invention will be hereinafter illustrated on the said practical and preferred modification.

The starting compound in the present process is 1,2:3,4-di-O-isopropylidene-epi-inositol [I], which can be prepared from epi-inositol [Th. Posternak: Methods in Carbohydrate Chemistry, Academic Press, New York, vol. 1, pp. 289–291] by a per se conventional procedure [S. J. Angyal et al.: J. Chem. Soc., 1952, 686; ibid., 1958, 375].

The said 1,2:3,4-di-O-isopropylidene compound [I] is first subjected to sulfonylation. The sulfonylation may be carried out by treating the 1,2:3,4-di-O-isopropylidene compound [I] with a sulfonylating agent such as alkanesulfonyl halide (e.g. methanesulfonyl chloride, methanesulfonyl bromide, ethanesulfonyl chloride) or arenesulfonylhalide (e.g. benzenesulfonyl chloride, p-toluenesulfonyl chloride, p-bromobenzenesulfonyl chloride) in a basic solvent (e.g. pyridine, picoline), usually from 0 to 60° C.

The thus prepared 1,2:3,4-di-O-isopropylidene-5,6-di-O-sulfonyl compound [II] is then subjected to deacetonization. The deacetonization may be effected by treating the 1,2:3,4-di-O-isopropylidene-5,6-di-O-sulfonyl compound [II] with a mild acid such as aqueous organic acid (e.g. acetic acid, propionic acid) in a per se conventional procedure.

The resultant 5,6-di-O-sulfonyl compound [III] is then subjected to acylation. The acylation may be effected by treating the 5,6-di-O-sulfonyl compound [III] with an acylating agent such as alkanoyl halide (e.g. acetyl chloride, acetyl bromide, propionyl chloride), aroyl halide (e.g. benzoyl chloride, toluoyl chloride), alkanoic anhydride (e.g. acetic anhydride, propionic anhydride) or aroic anhydride (e.g. benzoic anhydride) in a per se conventional procedure.

The resulting 1,2,3,4 - tetra - O - acyl-5,6-di-O-sulfonyl compound [IV] is then subjected to azidation. The azidation may be performed by treating the 1,2,3,4-tetra-O-acyl-5,6-di-O-sulfonyl compound [IV] with an alkali azide (e.g. sodium azide) in a hydrous organic solvent (e.g. 2-methoxyethanol, dimethylformamide), ordinarily while heating at the boiling temperature of the solvent.

The thus prepared 4,6-diazido-4,6-dideoxy compound [V] is then subjected to acylation. The acylation may be executed by treating the 4,6-diazido-4,6-dideoxy compound [V] with an acylating agent as mentioned above in a per se conventional procedure.

The resultant 1,2,3,5-tetra-O-acyl-4,6-diazido-4,6-dideoxy compound [VII] is then subjected to reduction. The reduction may be effected by treating the 1,2,3,5-tetra-O-acyl-4,6-diazido-4,6-dideoxy compound [VI] with hydrogen in the presence of a conventional reduction catalyst (e.g. Adams' catalyst, palladium-carbon, Raney nickel) in a suitable solvent (e.g. methanol, ethanol), usually at room temperature (i.e. 10 to 30° C.).

The resulting 1,2,3,5-tetra-O-acyl-4,6-diamino-4,6-dideoxy compound [VII] is then subjected to acylation. The acylation may be effected by treating the 1,2,3,5-tetra-O-acyl-4,6-diamino-4,6-dideoxy compound [VII] with an acylating agent as mentioned above in a per se conventional procedure.

The thus obtained 1,2,3,5-tetra-O-acyl-4,6-diacylamino-4,6-dideoxy compound [VIII] is then subjected to hydrolysis. The hydrolysis may be effected by treating the 1,2,3,5 - tetra - O - acyl-4,6-diacylamino-4,6-dideoxy compound [VIII] with an alkali or an acid in an aqueous medium. When the reaction is carried out under a relatively mild condition, for instance, using a weak alkali such as ammonia at room temperature, only the acyloxy groups are hydrolyzed to give the 4,6-diacylamino-4,6-dideoxy-myo compound [IX]. When the reaction is performed under a comparatively strong condition, for example, employing a strong acid such as hydrochloric acid while heating on a water bath, not only the acyloxy groups but also the acylamino groups are hydrolyzed to afford the corresponding 4,6-diamino - 4,6 - dideoxy-myo compound of the formula:

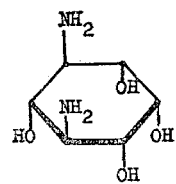

[IX′]

In the latter case, the 4,6-diamino-4,6-dideoxy-myo compound [IX′] may be acylated under a relatively mild condition, for instance, by treating with an alkanoic anhydride in the presence of an alkali at room temperature so that the acylation proceeds selectively on the amino groups to give the 4,6-diacylamino-4,6-dideoxy-myo compound [IX].

The above prepared 4,6-diacylamino-4,6-dideoxy-myo compound [IX] is then subjected to oxidation. The oxidation may be executed by treating the 4,6-diacylamino-4,6-dideoxy-myo compound [IX] with oxygen in the presence of a conventional oxidation catalyst (e.g. platinum black, platinum oxide) in water, usually at 10 to 40° C.

The resultant 2-oxo-4,6-diacylamino - 2,4,6 - trideoxy compound [X] is then subjected to reduction. The reduction may be carried out by treating the 2-oxo-4,6-diacylamino-2,4,6-trideoxy compound [X] with an alkali metal amalgam (e.g. sodium amalgam, potassium amalgam) in a hydrous solvent (e.g. water, methanol, ethanol, acetic acid), normally at room temperature.

The resulting 4,6-diacylamino-4,6-dideoxy-scyllo compound [XI] is then subjected to hydrolysis. The hydrolysis may be executed by treating the 4,6-diacylamino-4,6-dideoxy-scyllo compound [XI] with an acid in an aqueous medium, usually while heating.

The thus obtained 4,6-diamino-4,6-dideoxy-scyllo compound [XII] is identified with streptamine in the free or acylated form. Accordingly, the above aminocyclitols [II to XI] are useful as intermediates in the synthesis of streptamine and also of streptomycin.

Although the reactions were hereinabove illustrated stepwise, the product in each step may be subjected to the reaction of the subsequent step with or without previous separation and purification.

The following examples set forth presently-preferred embodiments of this invention. In these examples, the abbreviations have each the conventional significance: e.g. mg.=milligrams, g.=grams, ml.=millilitres, °C.=degrees centigrade.

EXAMPLE 1

Preparation of 1,2:3,4-di-O-isopropylidene-5,6-di-O-mesyl-epi-inositol:

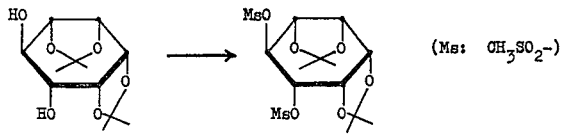

A solution of 1,2:3,4-di-O-isopropylidene-epi-inositol (1.64) g. in anhydrous pyridine (20 ml.) is cooled at 0 to 5° C. Methanesulfonyl chloride (2.8 ml.) is added thereto while stirring. The resultant mixture is allowed to stand in a refrigerator for 2 days. The reaction mixture is poured into about three times amount of a mixture of ice and water and allowed to stand. The separated crystals are collected by filtration, washed with water and dried to give 1,2:3,4-di-O-isopropylidene-5,6-di-O-mesyl-epi-inositol (2.54 g.). When recrystallized from ethanol, there are obtained scaly crystals melting at 148 to 149° C.

EXAMPLE 2

Preparation of 5,6-di-O-mesyl-epi-inositol:

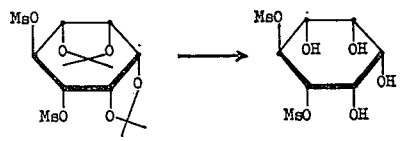

The above prepared 1,2:3,4-di-O-isopropylidene-5,6-di-O-mesyl-epi-inositol (1.9 g.) is added to 50% acetic acid (20 ml.), and the resultant mixture is heated at 100° C. for 2 hours. The reaction mixture is concentrated under reduced pressure. The resulting oily product is admixed with ethanol. The crystallized substance is collected by filtration and washed with ethanol to give 5,6-di-O-mesyl-epi-inositol (1.5 g.) as crystals melting at 122 to 130° C.

EXAMPLE 3

Preparation of 5,6-di-O-mesyl-epi-inositol tetraaceate:

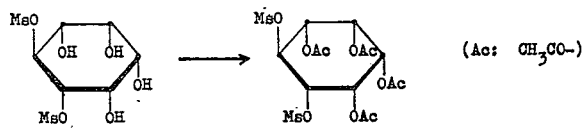

The above prepared 5,6-di-O-mesyl-epi-inositol (1.2 g.) is dissolved in a mixture of acetic anhydride (10 ml.) and pyridine (10 ml.), and the resulting solution is allowed to stand at room temperature for 24 hours. The reaction mixture is concentrated under reduced pressure. The residue is crystallized from ethanol to give 5,6-di-O-mesyl-epi-inositol tetraacetate (1.7 g.) as crystals melting there are obtained pillars melting at 166.5 to 168.5° C. at 164 to 168° C. When recrystallized from ethanol,

EXAMPLE 4

Preparation of 4,6-diazido-4,6-dideoxy-myo-inositol tetraacetate:

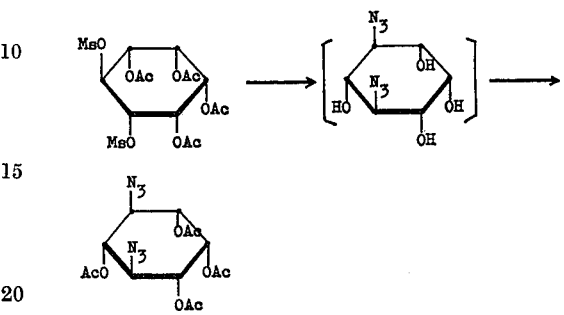

The above prepared 5,6-di-O-mesyl-epi-inositol tetraacetate (4.4 g.) and sodium azide (4.4 g.) are added to 90% aqueous 2-methoxyethanol (150 ml.), and the resultant mixture is refluxed for 40 hours. The reaction mixture is concentrated under reduced pressure to give partially acetylated 4,6-diazido-4,6-dideoxy-myo-inositol as a brown residue. The brown residue is, after drying, admixed with a mixture of acetic anhydride and pyridine (1:1) (40 ml.) and then allowed to stand at room temperature overnight. After removal of the insoluble material by filtration, the filtrate is concentrated under reduced pressure. The resulting oily product is admixed with ethanol. The separted granules are collected by filtration while soaking in ethanol, washed with ethanol and dried to give 4,6-diazido-4,6-dideoxy-myo-inositol tetraacetate (0.97 g.) as crystals melting at 143 to 146.5° C. When recrystallized from ethanol, there are obtained colorless plates melting at 147 to 149° C.

EXAMPLE 5

Preparation of myo-inosadiamine-4,6 hexaacetate:

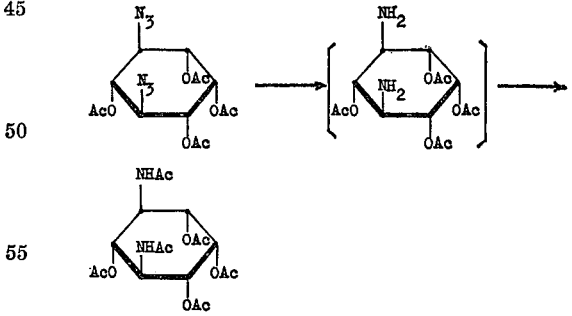

The above prepared 4,6-diazido-4,6-dideoxy-myo-inositol tetraacetate (0.61 g.) is dissolved in ethanol (60 ml.) while heating. After cooling, Adams' catalyst (60 mg.) and ammonia-saturated ethanol (0.2 ml.) are added thereto. The resultant mixture is shaken at room temperature under 50 p.s.i.g. of hydrogen for 3 hours. The catalyst is eliminated by filtration. The filtrate is concentrated under reduced pressure to give a reduction product as colorless oil. The colorless oil is, after drying, admixed with a mixture of acetic anhydride and pyridine (1:1) (10 ml.) and then heated at 100° C. for 1 hour. The reaction mixture is concentrated under reduced pressure. The separated plates are collected by filtration while soaking in ethanol and washed with ethanol to give myo-inosadiamine-4,6-hexaacetate (0.60 g.) as crystals melting at 290 to 292° C. When recrystallized from ethanol, there are obtained colorless plates.

EXAMPLE 6

Preparation of myo-inosadiamine-4,6:

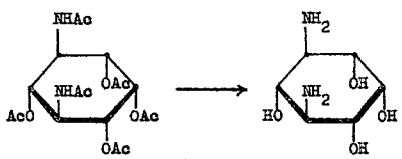

The above prepared myo-inosadiamine-4,6-hexaacetate (190 mg.) is dissolved in 6 N hydrochloric acid, and the resulting solution is heated on a water bath for 3 hours. The reaction mixture is concentrated under reduced pressure. The resultant colorless oil is dissolved in methanol and ethanol is gradually added thereto whereby a white solid is precipitated. The precipitate is collected by filtration and washed with ethanol to give myo-inosadiamine-4,6-dihydrochloride as white hygroscopic substance.

EXAMPLE 7

Preparation of di-N-acetyl-myo-inosadiamine-4,6:

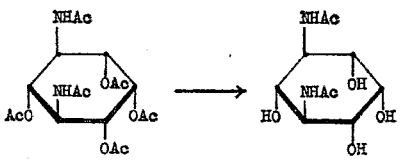

To ammonia-saturated methanol (25 ml.), myo-inosadiamine-4,6-hexaacetate prepared as in Example 5 (257 mg.) is added, and the resultant mixture is allowed to stand at room temperature. After 12 hours, the separated gel is collected by filtration and washed with methanol to give di-N-acetyl-myo-inosadiamine-4,6 (80 mg.) as crystals. The mother liquor is concentrated under reduced pressure. The residue is admixed with water and ethanol, and the resulting mixture is allowed to stand. The precipitated crystals are collected by filtration and combined with the above obtained crystals. The total crystals (150 mg.) are recrystallized from a mixture of water and ethanol to give white, long needles.

EXAMPLE 8

Preparation of hexaacetyl-streptamine:

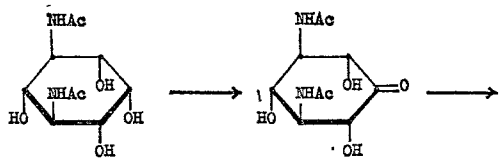

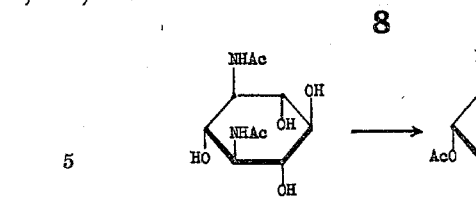

To Adams' catalyst (382 mg.) hydrogenated in water (30 ml.), there is added a solution of the above prepared di-N-acetyl-myo-inosadiamine-4,6 (373 mg.) in water (20 ml.), and the resultant mixture is shaken at 40° C. under 10 p.s.i.g. of oxygen for 22 hours. After elimination of the catalyst by filtration, the filtrate is concentrated under reduced pressure to make 25 ml., in which di-N-acetyl-2-oxo-myo-inosadiamine-4,6 is included. The concentrated product is reduced with sodium amalgam (3%, 6 g.) at pH 5.5 to 6.5 while addition of glacial acetic acid. The reaction mixture is decanted, and the mercury is separated. The mercury is washed with a small amount of water. The washing is combined with the reaction mixture and then concentrated under reduced pressure. The reduction product thus obtained as a solid contains di-N-acetyl-streptamine. It is, after drying, admixed with a mixture of acetic anhydride and pyridine (1:1) (20 ml.) and allowed to stand at room temperature overnight. The insoluble substance is removed by filtration. The filtrate is concentrated under reduced pressure. The separated crystals are collected by filtration while soaking in ethanol, washed with ethanol and dried to give hexaacetyl-streptamine (76.9 mg.) as crystals of which the transition point is 243 to 248° C.

The thus obtained hexaacetyl-streptamine can be converted into streptamine by hydrolyzing with 6 N hydrochloric acid while heating on a water bath.

What is claimed is:
1. A compound of the formula:

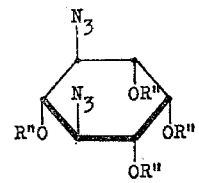

wherein R" is a lower carboxylic acyl group.
2. The compound claimed in claim 1, wherein R" is acetyl.

References Cited

Suami, et al., Bull. Chem. Soc., Japan, 38(5)855–6 (1965).

HENRY R. JILES, Primary Examiner

C. M. SHURKO, Assistant Examiner

U.S. Cl. X.R.

260—210, 211, 340.5, 456, 477, 490, 557, 558, 563